(12) United States Patent
Nandagopal et al.

(10) Patent No.: US 8,542,602 B2
(45) Date of Patent: Sep. 24, 2013

(54) APPARATUS AND METHOD FOR A MULTI-LEVEL ENMESHED POLICER

(75) Inventors: Thyagarajan Nandagopal, Edison, NJ (US); Thomas Y Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 263 days.

(21) Appl. No.: 12/317,807

(22) Filed: Dec. 30, 2008

(65) Prior Publication Data
US 2010/0165855 A1    Jul. 1, 2010

(51) Int. Cl.
*H04J 1/16* (2006.01)
(52) U.S. Cl.
CPC ..................................... *H04L 47/10* (2013.01)
USPC ............................ 370/252; 370/235; 370/256
(58) Field of Classification Search
CPC ......................................................... H04L 47/10
USPC ................. 370/229–235, 252, 253, 254, 256
See application file for complete search history.

(56) References Cited

U.S. PATENT DOCUMENTS

| | | | |
|---|---|---|---|
| 7,042,848 B2 * | 5/2006 | Santiago et al. | 370/253 |
| 7,161,904 B2 | 1/2007 | Hussain et al. | 370/230 |
| 7,266,606 B2 | 9/2007 | Ganti et al. | 709/226 |
| 7,388,837 B1 * | 6/2008 | St-Denis et al. | 370/235 |
| 7,822,048 B2 * | 10/2010 | Buskirk et al. | 370/401 |
| 2002/0186661 A1 * | 12/2002 | Santiago et al. | 370/252 |
| 2003/0099199 A1 * | 5/2003 | Kiremidjian et al. | 370/230.1 |
| 2009/0109847 A1 * | 4/2009 | Stephenson et al. | 370/232 |

FOREIGN PATENT DOCUMENTS

WO    WO 2005/112347 A2    11/2005

OTHER PUBLICATIONS

J. Heinanen, et al, "A Single Rate Three Color Marker", *Request for Comments: 2697, IETF*, Sep. 1999, 6 pages.
J. Heinanen, et al, "A Two Rate Three Color Marker", *Request for Comments: 2698, IETF*, Sep. 1999, 5 pages.

* cited by examiner

*Primary Examiner* — Ricky Ngo
*Assistant Examiner* — Kan Yuen
(74) *Attorney, Agent, or Firm* — M. J. Hodulik

(57) ABSTRACT

An enmeshed hierarchy of policers, different from traditional tree-based hierarchical system of policers is used in accordance with the present invention. A goal of using an enmeshed architecture of policing systems is to allow for a more complex set of policies to be defined across a network. Hierarchical/cascading systems ensure that the higher granularity assignments essentially dictate/constrain the behavior of finer grained assignments at higher levels for sub-flows. There is only one type of metric possible for the largest granular policer, so the only way to implement multiple system-wide metrics is to repeat the hierarchy multiple times over, which adds to the delay of the packet and the complexity of the router. In accordance with the enmeshed architecture of the present invention, multiple system-wide metrics can be implemented simultaneously, which allows for easier management of the various macro-level policies by the manager of an access network.

15 Claims, 1 Drawing Sheet

APPARATUS AND METHOD FOR A MULTI-LEVEL ENMESHED POLICER

TECHNICAL FIELD

This invention relates generally to communications systems and more particularly to traffic conditioners for policing packets in communications systems.

BACKGROUND OF THE INVENTION

While existing hierarchical policers provide a fair amount of flexibility to manage existing traffic models, they are insufficient in many instances, especially when it comes to emerging applications. Consider the case when there are many users operating in a network and sharing the same access router/element. Each user can run potentially many applications that are accessing the network, and each of these applications can in turn generate multiple network flows. We want to control how much bandwidth each flow uses, cap the bandwidth used by each application, and cap the total bandwidth available for each user as well. This can be done using the above hierarchical structure. The limits are often elastic in nature, where the bandwidth used a flow can exceed its limits as long as there are other flows not using their share. In other words, flows are allowed to share unused bandwidth.

In the current models, however, adding up the limits placed on individual sub-flows at a given level does not equal the bandwidth placed on the aggregated flows at the next level. This is, by design, the nature of the diverse traffic sources that generate data on the Internet. For example, a provider might want to cap each user to not more than 5 Megabits per second (Mbps). It may also restrict peer-to-peer apps from that user to not use more than 3 Mbps, and the Web browser to not use more than 4 Mbps.

Therefore, if, in addition, we want to cap the bandwidth available to a particular type of application across the network (as measured at the access router), then current policer models fall short, and cannot be used without incurring performance penalties.

SUMMARY OF THE INVENTION

An advance is made over the prior art in accordance with the principles of the present invention that is directed to a new approach for a system and method of communication packet policers. In accordance with one aspect of the invention, an enmeshed hierarchy of policers, different from traditional tree-based hierarchical system of policers is used.

A goal of using an enmeshed architecture of policing systems is to allow for a more complex set of policies to be defined across a network. Hierarchical/cascading systems ensure that the higher granularity assignments essentially dictate/constrain the behavior of finer grained assignments at higher levels for sub-flows. There is only one type of metric possible for the largest granular policer, so the only way to implement multiple system-wide metrics is to repeat the hierarchy multiple times over, which adds to the delay of the packet and the complexity of the router. In accordance with the enmeshed architecture of the present invention, multiple system-wide metrics can be implemented simultaneously, which allows for easier management of the various macro-level policies by the manager of an access network.

In one embodiment of the invention, an architecture is presented for policing packets in a communications network comprising a plurality policing elements. Each policing element processes packet flows to indicate whether a packet is in conformance with given parameters of a flow. At least two hierarchical levels of policing elements are present, wherein a flow is capable of being policed by multiple policing elements such that hierarchies of said policing elements become enmeshed with one another.

In another aspect of the invention, a resulting hierarchical graph of enmeshed ones of said policing elements is acyclic, wherein the occurrence of a cycle is defined as a same flow definition and all its subsets being processed more than once by any particular policing element. A packet belonging to a specific flow is marked as conforming only if the packet is not violative of conformance parameters of a policing element through which the packet passes.

BRIEF DESCRIPTION OF THE DRAWING

The teachings of the present invention can be readily understood by considering the following detailed description in conjunction with the accompanying drawings, in which.

DETAILED DESCRIPTION

Figure 1:
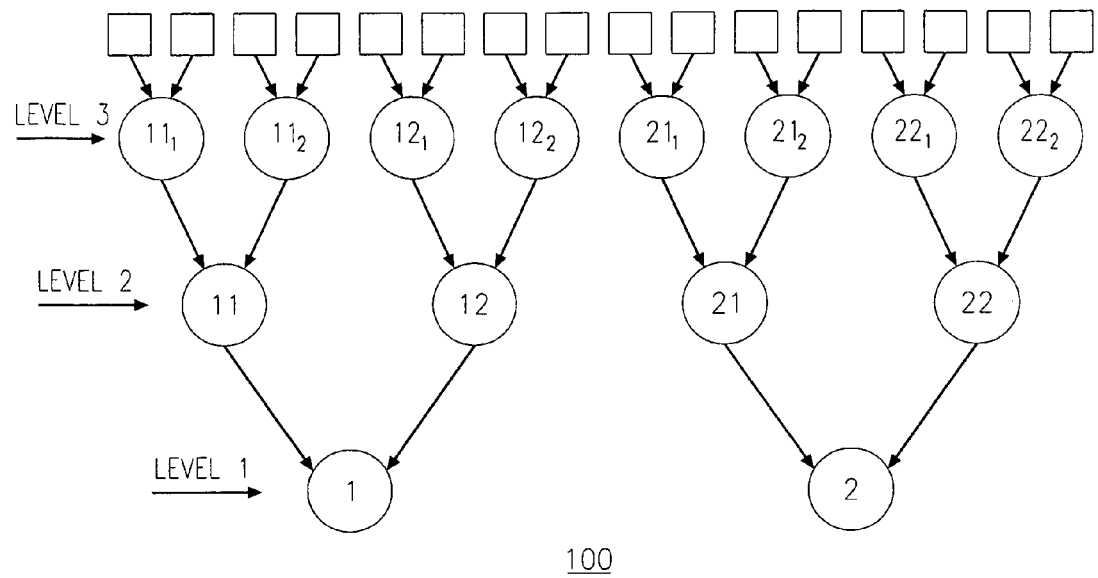
FIG. 1 shows one exemplary embodiment of a laser illumination device in accordance with one aspect of the present invention.

Exemplary embodiments of the invention will now be described while referring to the figures, several of which may be simultaneously referred to during the course of the following description.

As discussed in the background of the invention, current data traffic policing models fall short and cannot be used for more sophisticated policing functions such as limiting the bandwidth available to a particular type of application across a network without incurring significant performance penalties. One reason is that in the current models, the adding up of the limits placed on individual sub-flows at a given level does not equal the bandwidth placed on the aggregated flows at the next level.

For example, a service provider might want to limit the total bandwidth usage of peer-to-peer applications at an access router, and/or the provider might want to limit the bandwidth usage of video traffic flows (generated by multiple applications such a video conferencing, IPTV video, etc.). A typical situation might see the provider wanting to restrict aggregate video flow use to $X\_i$ Mbps, as well as restricting a particular application that generates or requests video to use not more than $X\_j$ Mbps. Using the existing models, traffic from all users must be aggregated first, and then all individual video flows must be filtered out to do the policing. The resultant flows are aggregated again to do another round of policing on flows generated by the particular application. This leads to heavy delays at the policing end-point, and also results in increased network equipment costs.

The present invention provides a solution that addresses this problem, and provides a flexible policing mechanism to implement such policies as those described above. Using the existing hierarchical policing models, traffic from all users must be aggregated first, and then all individual video flows must be filtered out to do the policing; the resultant flows are aggregated again to do another round of policing on flows generated by the particular application. This leads to heavy delays at the policing end-point, and also results in increased network equipment costs as well. More complex policies are essentially not possible under existing solutions.

In accordance with the present invention, an enmeshed hierarchy of policers, different from traditional tree-based hierarchical system of policers is used. The primary goal of using an enmeshed architecture of policing systems is to allow for a more complex set of policies to be defined across a network. Hierarchical/cascading systems ensure that the higher granularity assignments essentially dictate/constrain the behavior of finer grained assignments at higher levels for sub-flows. There is only one type of metric possible for the largest granular policer, so the only way to implement multiple system-wide metrics is to repeat the hierarchy multiple times over, which adds to the delay of the packet and the complexity of the router. In the enmeshed architecture of the present invention, multiple system-wide metrics can be implemented simultaneously. This allows for easier management of the various macro-level policies by the manager of the access network.

In typical network traffic policers, there are at least two components: a meter and a marker. The meter measures the bandwidths of the incoming flows, and the marker marks the packets of the flows as conforming or non-conforming. Typical examples of these components are described in the IETF standards: RFC 2697 and RFC 2698. The output of the policer is then used by either a shaper or any other queue management mechanism in order to ensure the desired network behavior.

Basic policers, as described above, provide traffic policing at the level of a set of flows. In many instances, one wants to further divide a given flow into sub-flows, and individually police each of these sub-flows, in addition to policing the aggregate flow as well. A simple way to achieve this is to cascade two policing functions in a hierarchical fashion. The top level polices the sub-flows, while the bottom level polices the aggregate flow formed by merging the sub-flows. There can be multiple top-level policers, one for each flow seen at the bottom level. A visual representation of this cascaded structure is as a tree. One could similarly place these tree structures laterally, or stack them one above the other in order to achieve finer flow differentiation, as described in the U.S. Pat. Nos. 7,042,848, 7,388,837, 7,161,904, 7,266,606, and EU Patent EP1757020, the contents of each which are incorporated herein by reference. A graphical view of an example structure 100, based on what is currently in use, is shown in FIG. 1.

In FIG. 1, the circular nodes are the individual policers, and the square nodes are micro-flows. The bottom-most level (Level 1) contains two policers 1, 2, each policing a different set of flows. At the middle level (Level 2), there are two policers each, policer 11, 12 and policer 21, 22, where these policers process the sub-flows of each flow entering the bottom-level policer 1, 2, respectively. A further set of policers (Level 3) processes a finer granularity of micro-flows within the sub-flows at the top level. One can arbitrarily extend this tree to any number of levels. The traffic parsing/policing can start at the top-level and move down the tree to the bottom level, or vice versa. However, packets that are marked as conforming or non-conforming depend on the direction of policing in the hierarchy. In the context of the present explanation, we do not worry about the policing direction.

While the existing methods described above provide a fair amount of flexibility to manage existing traffic models, they are insufficient in many instances, especially when it comes to emerging applications. Consider the case when there are many users operating in a network and sharing the same access router/element. Each user can run potentially many applications that are accessing the network, and each of these applications can in turn generate multiple network flows. As stated, we want to more easily and efficiently control how much bandwidth each flow uses, cap the bandwidth used by each application, and cap the total bandwidth available for each user as well.

Note that a flow can be identified by a combination of any fields in the packet header and data: source IP address, destination IP address, the source port and destination port. Additionally, a protocol identifier or application data inside the data payload can also be used to identify flows. The actual method of identifying flows is not relevant to this discussion. However, we only note that in current hierarchical cascaded policing systems, each flow definition gets policed by only one policer, say, X. Once it is policed, it gets aggregated with other flows policed by X, and the resultant aggregate flow is identified by a new flow definition. While the original flow definition is a subset of this aggregate, the exact flow definition is still policed by at most one policer.

Present Invention Solution

Figure 2:
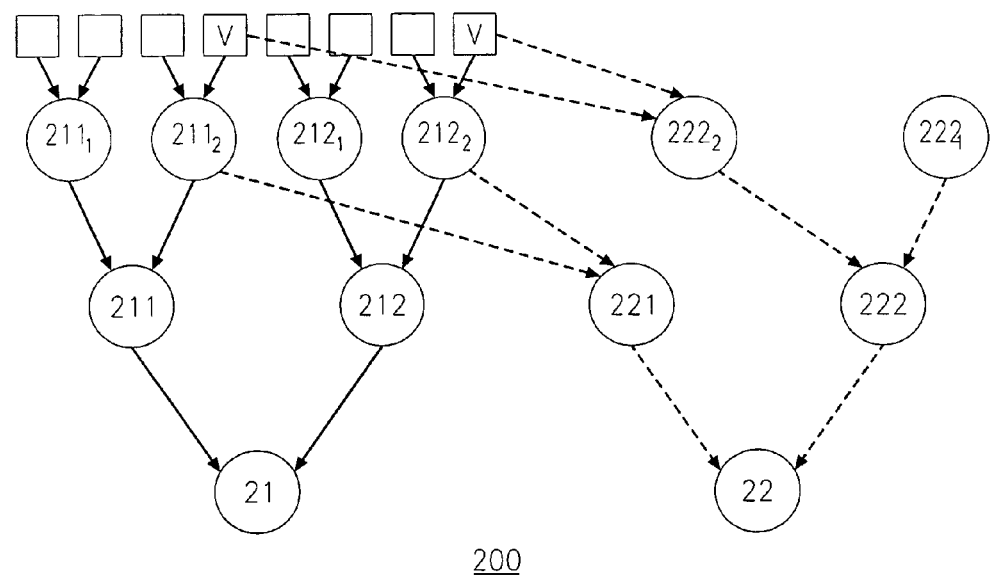
FIG. 2 shows one embodiment of a mesh architecture of policers in accordance with the principles of the present invention.

In the present invention solution, the tree of policers now becomes a mesh 200 of policers, as shown in FIG. 2. A policer at each level can now feed into more than one policer at the subsequent level. In FIG. 2, as an illustration of our solution, let nodes 211 and 212 denote two distinct users. Let each user run two applications, with a policer for each application (denoted with subscripts 1 and 2 respectively). Let's say application 2 has two sub-flows in it, and we want to monitor the second type of flow, here marked by V. Let node $222_2$ be the policer for flows of type V across all users. Similarly, let policer 221 be the policer for all data processed by application 2. We can now place aggregate bandwidth limits on flows of type V as well as on that of application 2 across all users seen at the access router. Using an enmeshed system of policers allows us to formally define these requirements, while also allowing for a simple architecture to implement, as described in the next section. Current systems that use cascading hierarchies of policers cannot handle these requirements, as shown earlier.

The primary goal of using an enmeshed architecture 200 of policing systems is to allow for a more complex set of policies to be defined across a network. Hierarchical/cascading systems ensure that the higher granularity assignments essentially dictate/constrain the behavior of finer grained assignments at higher levels for sub-flows. There is only one type of metric possible for the largest granular policer, so the only way to implement multiple system-wide metrics is to repeat the hierarchy multiple times over, which adds to the delay of the packet and the complexity of the router. In our proposed enmeshed architecture, multiple system-wide metrics can be implemented simultaneously. This allows for easier management of the various macro-level policies by the manager of the access network.

Essentially, the present invention solution comprises of the traditional hierarchical cascaded system of policers. However, in addition, each flow definition (e.g. flow, sub-flow, micro-flow, any flow-tuple) can be policed by more than one policer. This results in the policer hierarchies becoming enmeshed with each other. The key condition is that the resulting hierarchy graph is acyclic, where we define the occurrence of a cycle as the same flow definition, and all of its subsets, being processed more than once by any particular policer. This is to prevent the bandwidth used by a single flow being counted twice by a policer, which results in under-utilization of the system.

The conditions that define our enmeshed cascade of policers are as follows:

1. Each flow definition can be policed by more than one policer.

2. Each policer polices a flow definition, and all of its subsets, at most once.
3. The output of a policer is categorized by a new flow definition, and can be fed as the input into another policer.
4. Each policer has its own set of parameters, such as peak/excess burst size, peak/committed information rate, drop probability/precedence, etc.
5. Each policer operates independently, and should not be influenced by the parameters of the other policers.
6. A packet belonging to a flow is marked as conforming only if it does not violate any conformance parameters at any of the policers it passes through.

Implementation

We now describe a procedure to implement the enmeshed hierarchy of policers. This is just one way of implementing the above architecture. Other potential methods may exist and are contemplated by the invention, though we believe this to be an efficient and practical way of realizing our system.

There are two types of queues: a data queue for actual packets and a control path queue for the various policers. Each packet conforms to one flow definition at any given time. Corresponding to each packet, there is one pointer in the data queue, and there is one control queue pointer for each policer that polices a flow definition. The control queue pointers all point to the data queue pointer corresponding to the packet, and also contain the flow definition currently in use to describe the flow to which the packet belongs.

Consider the example of FIG. 2 where flow V is policed by policer $212_2$ as well as $222_2$. For each packet of the flow, there is data queue pointer, and two control queue pointers. One control queue pointer is processed by policer $212_2$, and after processing, the flow definition is updated and passed to policer 212. The second control queue pointer is processed by policer $222_2$, and after processing, its flow definition is updated and passed to policer 221.

The simplest data structure for the data queue pointer, D(p), corresponding to packet p, consists of three entries: a pointer to the location of the entire packet in memory, l(p), the size of the packet, s(p), and the conformance status of the packet c(p), e.g. the color of the packet—in a three-color marker based system. For control queue pointers, C_i(p), there are at least two entries in each pointer: (a) a pointer, d_i(p), to the data queue pointer D(p), and (b) a flow definition, f_i(p), to which this flow currently belongs.

A policer marks flows as either conforming or non-conforming. In a three color marking system, the conformance status has three possible values: green (for fully conforming), yellow (for partially conforming), and red (for non-conforming). Since we allow a flow definition to be processed by multiple policers, some policers could mark the packet as conforming, and some could mark it as non-conforming. Each policer's policers could mark the packet as conforming, and some could mark it as non-conforming. Each policer operates independently, and should not be influenced by the parameters of the other policers.

A packet is ultimately sent out by the access router only if the packet is marked as conforming by all these policers. In order to ensure this, the conformance status, c(p) of packet p is common across all control queue packets C_i(p) referring to this packet. When processing C_i(p) at any given policer, we use c(p) to perform the policing, and also update c(p) at the end.

In a three-color policer, this ensures that once the packet is colored yellow/red by any one policer, all other subsequent policers of this packet see this color on the packet. Therefore, if the packet violates the parameters of even one policer, it is immediately marked so, and other policers can choose to ignore this packet in measuring the bandwidth usage, based on the marking algorithm in use.

This invention allows service providers to manage and police their traffic in a unique and very flexible manner. It allows for a complex set of bandwidth usage limits to be placed on traffic flows, which can then be grouped in multiple ways, with usage limits placed on the aggregate as well. Providers can adjust traffic in their network according to their desired policies.

The flexibility afforded by the proposed invention is impossible to achieve using existing solutions without incurring heavy per-packet delays and expensive packet processing, as described in the previous pages. Using existing solutions will result in high capex to add processing resources as well as reduce user QoE due to additional per-packet delays. On the other hand, providers will be encouraged to implement better bandwidth management policies by using our proposed invention.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. An architecture for policing packets in a communications network comprising:
    a plurality policing elements, each policing element processing packet flows to indicate whether a packet is in conformance with given parameters of a flow; and at least two hierarchical levels of said policing elements, wherein packets that are output from a policing element at one hierarchical level are capable of being simultaneously policed by multiple policing elements in a single direction at a subsequent hierarchical level using at least two parallel non-overlapping paths such that hierarchies of said policing elements become enmeshed with one another and such that two policers at a same hierarchical level use different flow definitions as applied to a packet being processed, wherein a packet includes a data queue pointer and a number of control queue pointers wherein said number of control queue pointers is the total number of policing elements across all hierarchical levels and
    wherein the data queue pointer includes a pointer to the location of the entire packet in memory, l(p), the size of the packet, s(p), and the conformance status of the packet c(p).

2. The architecture of claim 1, wherein a resulting hierarchical graph of enmeshed ones of said policing elements is acyclic.

3. The architecture of claim 2, wherein the occurrence of a cycle is defined as a same flow definition and all its subsets being processed more than once by any particular policing element.

4. The architecture of claim 1, wherein each policing element polices a flow definition, and all of its subsets, at most once, wherein an output of a policing element is categorized by a new flow definition, and can be fed as the input into another policing element.

5. The architecture of claim 4, wherein a packet belonging to a specific flow is marked as conforming only if said packet is not violative of conformance parameters of a policing element through which said packet passes.

6. The apparatus of claim 1, wherein the control queue pointer includes a pointer, $d\_i(p)$, to the data queue pointer $D(p)$, and a flow definition, $f\_i(p)$, to which this flow currently belongs.

7. A method of operating a cascaded hierarchical network of policing elements in a communications network comprising:

processing packet flows through said policing elements to indicate whether a packet is in conformance with given parameters of a flow; and policing packets in said network from a given policing element at one hierarchical level of said policing elements simultaneously by multiple policing elements in a single direction at a subsequent hierarchical level using at least two parallel non-overlapping paths such that hierarchies of said policing elements become enmeshed with one another and such that two policers at a same hierarchical level use different flow definitions as applied to a packet being processed, wherein each packet of a flow includes a data queue pointer and a number of control queue pointers wherein said number of control queue pointers for the packet equals the number of policing elements that police the flow or a sub-flow to which this packet belongs and wherein the data queue pointer includes a pointer to the location of the entire packet in memory, $l(p)$, the size of the packet, $s(p)$, and the conformance status of the packet $c(p)$.

8. The method of claim 7, wherein a resulting hierarchical graph of enmeshed ones of said policing elements is acyclic, wherein the occurrence of a cycle is defined as a same flow definition and all its subsets being processed more than once by any particular policing element.

9. The method of claim 8, wherein a packet belonging to a specific flow is marked as conforming only if said packet is not violative of conformance parameters of a policing element through which said packet passes.

10. The method of claim 7, wherein the control queue pointer includes a pointer, $d\_i(p)$, to the data queue pointer $D(p)$, and a flow definition, $f\_i(p)$, to which this flow currently belongs.

11. A policing apparatus for use in an enmeshed cascade of policers comprising:

a processor for processing packet flows to indicate whether a packet is in conformance with given parameters of a flow; and at least one input and out put port for receiving and transmitting said packet flows, respectively;

wherein a flow definition can be policed simultaneously by more than one policer in a single direction at a subsequent hierarchical level using at least two parallel non-overlapping paths and each policer polices a flow definition, and all of its subsets, at most once, wherein each packet of a flow includes a data queue pointer and a number of control queue pointers wherein said number of control queue pointers for the packet equals the number of policing elements that police the flow or a sub-flow to which this packet belongs and wherein the data queue pointer includes a pointer to the location of the entire packet in memory, $l(p)$, the size of the packet, $s(p)$, and the conformance status of the packet $c(p)$.

12. The apparatus of claim 11, an output of a policer is categorized by a new flow definition, and can be fed as the input into another policer.

13. The apparatus of claim 12, wherein each policer has its own set of flow parameters, including peak/excess burst size and peak/committed information rate, wherein each policer operates independently and is not be influenced by the parameters of other policers processing same flows.

14. The apparatus of claim 13, wherein a packet belonging to a flow is marked as conforming only if it does not violate any conformance parameters at any of the policers it passes through.

15. The apparatus of claim 11, wherein a resulting hierarchical graph of enmeshed ones of said policing apparatus is acyclic, wherein the occurrence of a cycle is defined as a same flow definition and all its subsets being processed more than once by any particular policing apparatus.

* * * * *